US007036698B2

(12) United States Patent
Allen

(10) Patent No.: US 7,036,698 B2
(45) Date of Patent: May 2, 2006

(54) BOAT LOADING SYSTEM FOR A VEHICLE

(75) Inventor: Scott R. Allen, Fieldbrook, CA (US)

(73) Assignee: Yakima Products, Inc., Beaverton, OR (US)

( * ) Notice: Subject to any disclaimer, the term of this patent is extended or adjusted under 35 U.S.C. 154(b) by 456 days.

(21) Appl. No.: 10/052,704

(22) Filed: Jan. 16, 2002

(65) Prior Publication Data
US 2002/0125280 A1 Sep. 12, 2002

Related U.S. Application Data

(60) Provisional application No. 60/262,175, filed on Jan. 16, 2001.

(51) Int. Cl.
B60R 9/00 (2006.01)

(52) U.S. Cl. .................. 224/310; 414/462; 224/321; 224/320; 224/280

(58) Field of Classification Search ............... 224/310, 224/320, 322, 324, 545, 551; 414/482, 466; 403/109.1, 109.2, 109.5, 109.7; 248/125.8, 248/413
See application file for complete search history.

(56) References Cited

U.S. PATENT DOCUMENTS

| 1,433,741 | A | * | 10/1922 | Parker | 5/119 |
| 2,444,422 | A | * | 7/1948 | Bradford | 148/220 |
| 2,573,187 | A | * | 10/1951 | Desilets | 414/462 |
| 2,729,499 | A | * | 1/1956 | Eggum | 296/26.09 |
| 3,042,240 | A | | 7/1962 | Cline | |
| 3,186,569 | A | * | 6/1965 | Andre | 414/462 |
| 3,460,694 | A | * | 8/1969 | Simms | 414/462 |
| 3,596,788 | A | * | 8/1971 | Willie | 414/462 |
| 3,740,034 | A | * | 6/1973 | Scroggins | 473/48 |
| 3,777,922 | A | | 12/1973 | Kirchmeyer | |
| 3,976,213 | A | | 8/1976 | Ball | |
| 4,034,879 | A | * | 7/1977 | Cudmore | 414/462 |
| 4,058,243 | A | * | 11/1977 | Tappan | 224/310 |
| 4,085,763 | A | * | 4/1978 | Thomas | 135/69 |
| 4,589,622 | A | * | 5/1986 | Hutter | 248/649 |
| 4,630,990 | A | | 12/1986 | Whiting | |
| 4,892,279 | A | * | 1/1990 | Lafferty et al. | 248/125.8 |
| 4,960,356 | A | * | 10/1990 | Wrenn | 414/537 |
| 5,215,233 | A | * | 6/1993 | Baldeck | 224/492 |
| 5,217,149 | A | * | 6/1993 | Simonett | 224/446 |
| 5,346,355 | A | * | 9/1994 | Riemer | 414/542 |
| 5,360,150 | A | * | 11/1994 | Praz | 224/310 |
| 5,628,336 | A | * | 5/1997 | Lee | 135/114 |
| 5,516,017 | A | | 5/1996 | Arvidsson | |

(Continued)

FOREIGN PATENT DOCUMENTS

FR    2501-601    9/1982

(Continued)

Primary Examiner—Tri M. Mai
(74) Attorney, Agent, or Firm—Kolisch Hartwell, P.C.

(57) ABSTRACT

Systems, including methods and apparatus, to facilitate loading a boat onto a vehicle. The systems include a load assist device mounted on a vehicle load carrier. The load assist device includes a support member that is stored substantially within a crossbar of the load carrier and telescopes outwardly from the crossbar to a deployed position. The support member may be returned to its stored position in the crossbar after the boat has been loaded onto the carrier.

12 Claims, 3 Drawing Sheets

U.S. PATENT DOCUMENTS 5,868,621 A * 2/1999 Parsons .................... 463/47.7
5,992,805 A * 11/1999 Tanner ...................... 248/161
6,015,074 A 1/2000 Snavely et al.
6,131,781 A 10/2000 Murray
6,357,643 B1 * 3/2002 Janner et al. ............... 224/310

FOREIGN PATENT DOCUMENTS

| FR | 2600953 A1 * | 4/1986 | ................ 224/310 |
| GB | 886743 | 1/1962 | |
| IT | 0511179 A1 * | 4/1992 | ................ 224/310 |

* cited by examiner

BOAT LOADING SYSTEM FOR A VEHICLE

CROSS-REFERENCE TO RELATED APPLICATIONS

This application is based upon and claims benefit under 35 U.S.C. § 119 from the following U.S. Provisional Patent Application, which is incorporated herein by reference: Ser. No. 60/262,175, filed Jan. 16, 2001.

FIELD OF THE INVENTION

The invention relates to systems for loading a boat onto a vehicle.

BACKGROUND OF THE INVENTION

A vehicle load carrier provides an economical rack device to expand cargo capacity of a vehicle. Attachment of the carrier to an exterior region of a vehicle generally does not impact passenger or cargo capacity of the vehicle's interior space, while providing the vehicle with a variety of exterior carrying capabilities. Accordingly, load carriers offer a desirable method to transport a wide variety of sports equipment, such as bicycles, skis, snowboards, and boats.

Despite the desirability of using a load carrier to carry a heavy, elongate item, such as a boat, loading the boat on the carrier may present a substantial challenge. Furthermore, this challenge may be substantially magnified when only one person is loading the boat. Due to the weight of the boat, one person many need substantial strength to lift, support, and balance the boat during loading. An alternative loading approach involves lifting the boat one end at a time. In this approach, the person first lifts and positions only one end of the boat on the carrier, while the other end of the boat remains lower, often supported by the ground. Unfortunately, this approach is generally impractical due to the geometry of a vehicle. One end of the boat often cannot be supported by the vehicle carrier while the other end is resting on the ground, for example, due to interference from the hood, trunk, or roof of the vehicle.

Interference from the vehicle's roof may be overcome by relying on a rigid projection extending lateral to a vehicle load carrier. A person can rest one end of the boat on the projection while the person lifts the other end of the boat onto the carrier. For example, see U.S. Pat. No. 6,131,781. However, a significant problem with this projection is that it attaches externally to intermediate portions of a crossbar, blocking the intermediate portions from carrying other items or attachments. Therefore, a more space-efficient load assist for occasional use is needed.

SUMMARY OF THE INVENTION

The invention provides systems, including methods and apparatus, to facilitate loading a boat onto a vehicle. The systems include a load assist device mounted on a vehicle load carrier. The load assist device includes a support member that is stored substantially within a crossbar of the load carrier and telescopes outwardly from the crossbar to a deployed position. The support member may be returned to its stored position in the crossbar after the boat has been loaded onto the carrier.

BRIEF DESCRIPTION OF THE DRAWINGS

FIG. 2 is a side elevation view of the load assist of FIG. 1, with the load assist in a stored position within the crossbar, in accordance with aspects of the invention.

FIG. 3 is a side elevation view of the load assist of FIG. 1 in a position deployed from the crossbar.

FIG. 4 is a sectional view of the load assist of FIG. 3, viewed generally along 4—4 of FIG. 3, in accordance with aspects of the invention.

FIG. 5 is a fragmentary, side elevation view of the load assist of FIGS. 1–4 in a stored position within the crossbar, in accordance with aspects of the invention.

DETAILED DESCRIPTION

The invention provides a load assist to facilitate loading a boat onto a load carrier mounted on a vehicle. The load assist includes a support member that is stored substantially within a crossbar of the load carrier and telescopes outwardly from the crossbar to a deployed position. The support member may be returned to its stored position in the crossbar after the boat has been loaded onto the carrier. The load assist may include a handle to facilitate positioning the support member, a locking mechanism to fix the support member in position, an internal stop mechanism to limit deploying travel of the support member, and/or a distally disposed load retainer to prevent cargo slippage from the support member. The load assist may offer a space-efficient, unobtrusive device that is easily and reversibly deployed.

Figure 1:
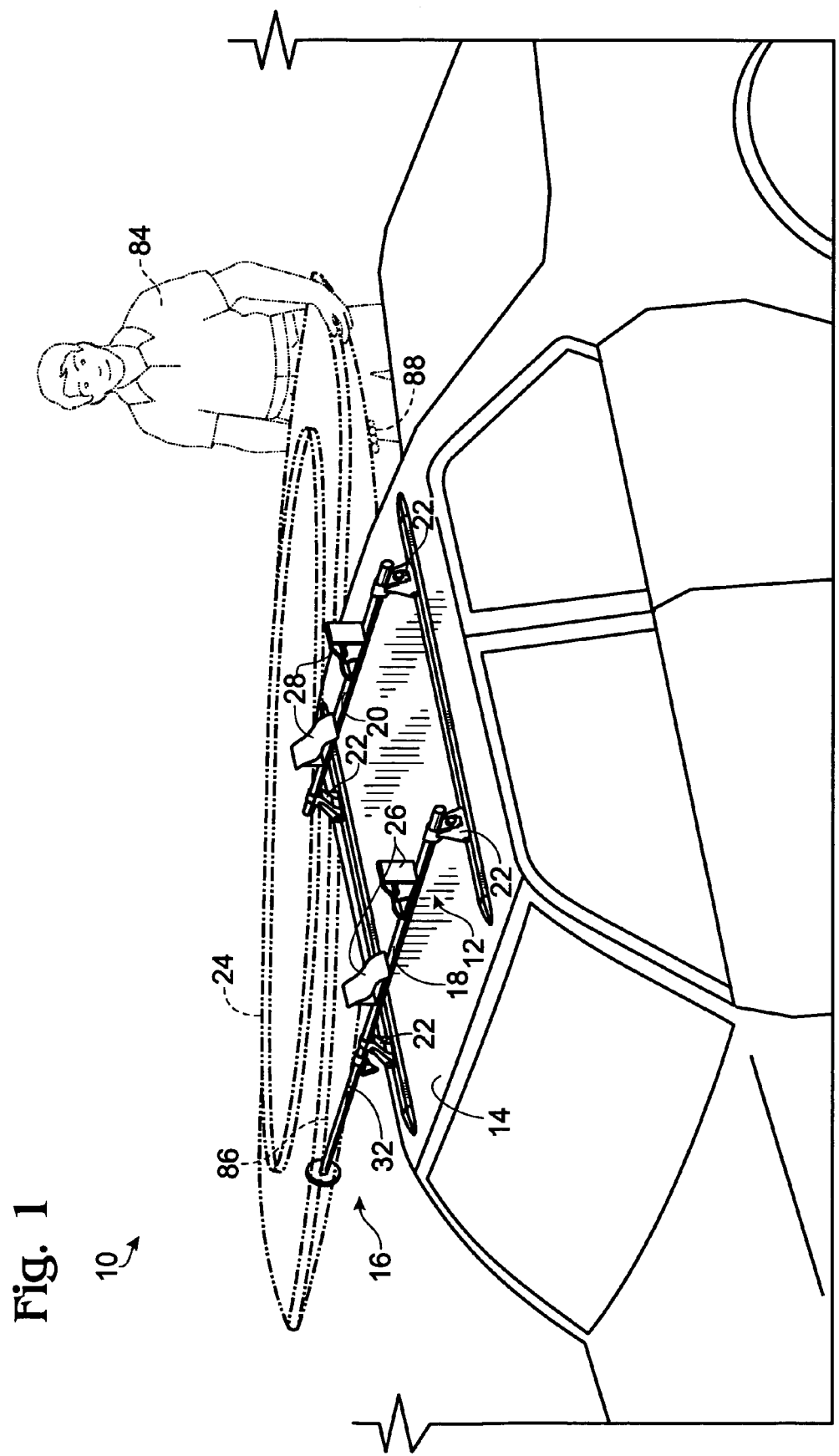
FIG. 1 is a perspective view of an embodiment of a load assist in a deployed position, extending from a crossbar of a vehicle load carrier and supporting an end of a boat, in accordance with aspects of the invention.
Figure 6:
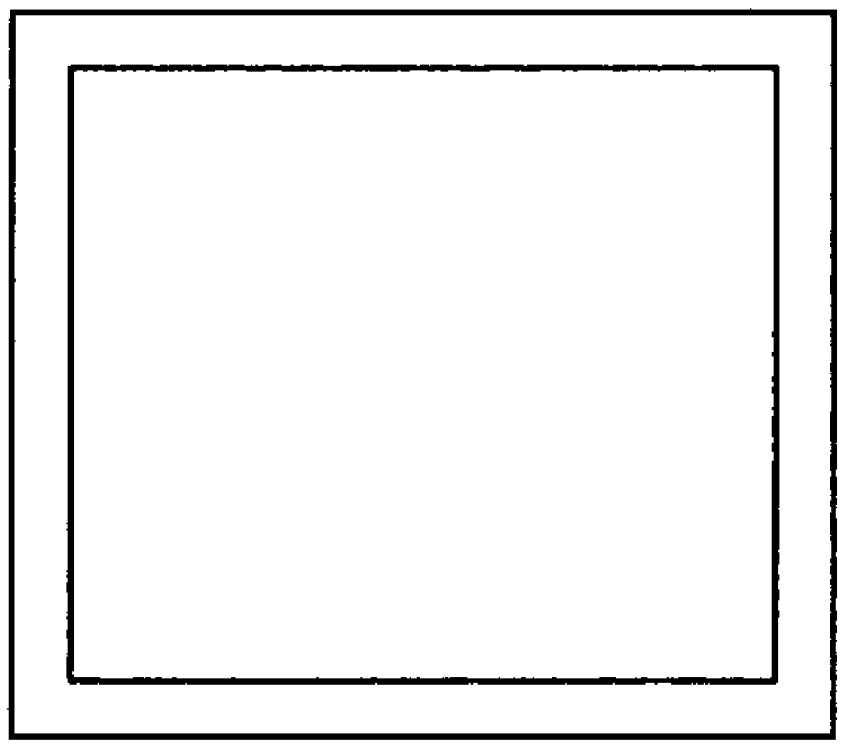
FIG. 6 is a sectional view of an alternative embodiment of a support member of the present disclosure.

A system 10 for loading and carrying a boat on a vehicle is show in FIG. 1. System 10 includes a vehicle load carrier 12 secured to a vehicle 14, with a load assist 16 mounted on a lateral aspect of the carrier. Load carrier 12 includes crossbars 18 and 20, which are generally disposed parallel to each other, at about the same height, and orthogonal to the long axis of vehicle 14. Crossbars 18, 20 may be connected to the top of vehicle 14 using plural towers 22. Each tower 22 may be attached to an exterior surface of vehicle 14 by any suitable means. For example, each tower 22 may include a clamping mechanism to grasp the top or edge of the roof or may be bolted to the car exterior. Tower construction and attachment methods for towers, also described as pedestals and stanchions, are well known in the art and are described, for example, in U.S. Pat. Nos. 4,496,089, 4,688,706, 4,586, 638, and 4,877,169, incorporated herein by this reference.

Crossbars 18, 20 may provide weight-bearing/attachment structure across most of their lengths. Cargo may be indirectly attached through accessories mounted on each crossbar. For example, to position and hold boat 24 on crossbars 18, 20, front and rear boat saddles 26 and 28, respectively, may be fastened to the crossbars. Alternatively, other attachment devices may be selected based on cargo geometry, and/or cargo may be directly fastened to one or both crossbars.

Crossbars 18, 20 are constructed of any material sufficient to bear the weight of the attached cargo during vehicle operation. At least one crossbar is hollow over some or all of its length to house at least part of load assist 16, as described below. Therefore, crossbars generally include tubular material with a cross-sectional geometry having any suitable shape, such as circular, rectangular, polygonal, curvilinear, or a combination of these geometries.

As shown in FIGS. 1–5, load assist 16 includes support member 32. Support member 32 is positionable, generally by sliding, between a storage position, in which the support member is housed substantially within crossbar 18 (see FIGS. 2 and 5), and a deployed position (see FIGS. 1 and 3). In the deployed position, support member 32 has telescoped outward from, but remains coaxial with, crossbar 18. Support member 32 extends laterally to vehicle 14 and a top support surface 34 is created by extension of support member 32 (see FIG. 3). Support surface 34 has a length dependent upon the degree of extension of support member 32. Indeed, to accommodate wider or narrower cargo, support member 32 may be deployed correspondingly. Crossbar 18 or 20 may house support member 32 in substantially all or a portion of the crossbar's length, but maximum extension of support member 32 may be somewhat less than the housed length of support member 32, as described below.

Support member 32 may have any suitable cross-sectional geometry. In some embodiments, support member 32 is generally complementary to a void extending centrally through crossbar 18. Thus, support member 32 may have a generally circular cross section and may be received in a cylindrical recess in the crossbar. In this case, support member 32 may rotate about its long axis, so that a side of support member 32 that provides top support surface 34 changes with specific rotational deployment. In other embodiments, the crossbar and/or support member may be configured to prevent rotation of the support member. Thus, the support member may have a noncircular cross section, for example an oval, a circle with a protrusion or indentation, a square, or a rectangle. Such an asymmetric cross section may be received by a correspondingly shaped void within the crossbar.

Figures 2, 3, 4, 5:
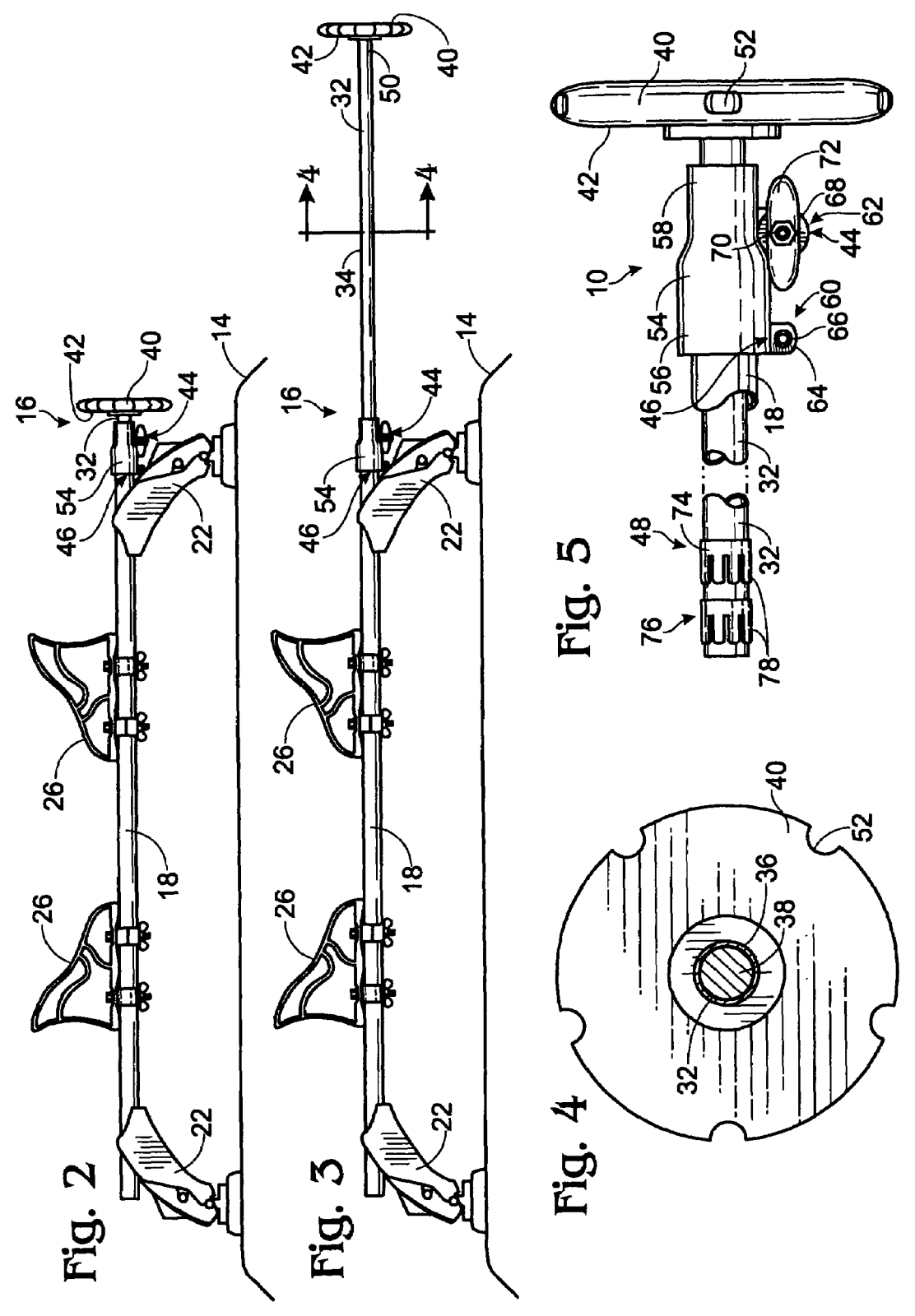

A support member is any elongate structure capable of substantial storage in a crossbar, but deployable to a form a support positioned lateral to a load carrier. The support member should be strong enough to hold at least about twenty pounds, at least about fifty pounds, or at least about one hundred pounds without damaging the support member. The support member may be formed of various materials in various forms. For example, the support member may be a solid bar or a hollow tube. FIG. 4 shows a cross-sectional view of an embodiment of support member 32. Support member 32 may include a sheath 36, which may be formed of a rust-resistant material, such as an aluminum alloy or a polymer. Core 38 of support member 32 may provide strength and thus may be composed of a strong material such as a steel alloy.

Load assist 16 also may include a handle 40 connected at a distal portion of support member 32, a load retainer 42 to retain a load on support member 32, and a locking mechanism 44 to regulate sliding ability of support member 32. In addition, load assist 16 may include a crossbar attachment mechanism 46 and a stop mechanism 48 (see FIG. 5) to limit outward travel and removal of the support member from the crossbar. Each of these features is described in more detail below.

Handle 40 is connected to a distal end portion 50 of support member 32 (see FIG. 3). Handle 40 includes any structure that can easily be grasped by a person's hand to facilitate sliding or rotational movement of support member 32. In some embodiments, handle 40 may include a radially symmetrical geometry with indentations 52 or other deviations from circularity disposed around its perimeter (see FIGS. 4 and 5). Indentations 52 may allow a person's hand to achieve a better grip on handle 40 during extension or retraction of support member 32.

Load retainer 42, also referred to as a stop device, may be disposed on distal end portion 50 of support member 32. A load retainer is any structure that limits outward movement of a load positioned on the support member, thus helping to prevent the load from falling off the distal end of the support member. In some embodiments, end stop 42 may be included in handle 40. End stop 42 may be a flange or other projection that extends generally radial from support member 32. The flange may extend circumferentially, as shown in device 16, or radially in one or plural directions. A circumferentially extending end stop may be more suitable with a support member that is rotatable.

Locking mechanism 44 is any mechanism that fixes the position of support member 32, preventing sliding along the support member's long axis. The locking mechanism may be mediated by structure that fixes position of support member 32 relative to crossbar 18. The locking mechanism may be coupled to an end portion of crossbar 18 with collar 54, as described below. In other embodiments, locking mechanism 44 may include a screw, pin, or other contact member, that extends through a hole in crossbar 18 and is received in a recess (or one of plural recesses) formed in support member 32.

Attachment mechanism 46 is any mechanism that connects crossbar 18 to load assist 16. Collar 54 may provide both locking mechanism 44 and attachment mechanism 46, as shown in FIG. 5. Collar 54 may include a central passage of at least two different diameters (not shown) configured to receive both crossbar 18 and support member 32. One diameter of the passage may be formed by proximal portion 56 of collar 54, which is configured to receive and hold an end portion of crossbar 18. A second diameter of the passage may be formed by distal portion 58 of collar 54. Distal portion 58 may be configured so that it is too small to receive crossbar 18, but large enough so that support member 32 can extend slidably through collar 54.

Proximal portion 56 and distal portion 58 may be fixed in position relative to a crossbar 18 and support member 32, respectively, by any suitable structure. For example, proximal portion 56 and/or distal portion 58 may include a screw, bolt, or pin, among others, that may be moved in or out of engagement with crossbar 18 and support member 32, respectively. Alternatively, as shown in FIG. 5, portions 56 and 58 may include clamp mechanisms 60 and 62, respectively, which effect reversible compression engagement with the crossbar and support member, respectively. In the depicted embodiment, clamp mechanism 60 includes tabs 64 that extend from, and flank, a cutout region in portion 56 (not shown). Movement of tabs 64 together, through tightening of bolt 66, draws together opposing interior walls of proximal portion 56, engaging crossbar 18. This clamping mechanism may provide a stable, yet reversible attachment of load assist 16 to load carrier 12.

Clamp mechanism 62 may function similar to clamp mechanism 60. Thus, clamp mechanism 62 may rely on a cutout region of distal portion 58 to effect adjustable spacing of opposing interior walls of distal portion 58. Compression of tabs 68 by rotating (tightening) nut 70 increases engagement of distal portion with support member 32. However, in contrast to clamp mechanism 60, which generally is loosened only when load assist 16 is detached from crossbar 18, clamp mechanism 62 may correspond to locking mechanism 44, which often will be loosened and tightened at least once during a cargo-loading operation. Therefore, clamp mechanism 62 may be easily adjustable, such as with nut 70 connected to an enlarged fastener handle 72. With this configuration, rotation of fastener handle 72 allows locking mechanism 44 to be readily adjusted by hand.

Stop mechanism 48 is any mechanism that prevents support member 32 from sliding completely out of crossbar 18. Stop mechanism 48 may be mediated by any structure on support member 32 that engages crossbar 18 or a portion of load assist 16, such as collar 54, at a predetermined degree of deployment. As shown in FIG. 5, stop mechanism 48 may include contact member 74. Contact member 74 extends radially from support member 32, providing an increased diameter that blocks travel through distal portion 58 of collar 54, by contact between contact member 74 and collar 54. This contact blocks complete removal and separation of support member 32 from load carrier 12.

Contact member 74 may form part of slide mechanism 76. Slide mechanism 76 includes any mechanism that limits the total area of frictional contact between support member 32 and crossbar 18. Thus, slide mechanism 76 may reduce friction and also may help guide support member within crossbar 18, preventing binding and wobble of the support member. Slide mechanism 76 may include one or more slide members 78 disposed along the long axis of support member 32. For improved effectiveness of the slide mechanism, support member 32 may be configured to have an outer diameter that is significantly less than the inner diameter of crossbar 18. The difference in these two diameters then may be filled at least partially by sliding member or members 78. By filling the gap in diameter between crossbar 18 and support member 32, sliding members 78 may help guide support member 32 along the interior of crossbar 18 and limit any wobbling motion of the support member during sliding or storage. Each sliding member 78 may include a substantially or partially annular portion and may be a component distinct from support member 32. Slide members 78 may be fixed in position by deformation, pressure, adhesive, welding, etc. Alternatively, slide members may be formed integrally with support member 32 and thus may be protrusions extending from the support member.

Referring again to FIG. 1, load assist 16 may be used to help person 84 load an elongate object, such as boat 24, without assistance from another person. First, support member 32 may be telescoped outward from load carrier 12, to an advantageous position that is generally lateral to vehicle 14. Person 84 may raise and place first end portion 86 of boat 24 on extended support member 32. While the first end portion is supported, the person more readily may manipulate second end portion 88 of boat 24. Second end portion 88 of boat 24 then may be lifted above load carrier 12, and boat 24 may be pivoted on support member 32 such that second end portion 88 is placed in position on saddles 28. This movement disposes boat 24 at an angle relative to the long axis of vehicle 14. Person 84 then may lift first end portion 86 of boat 24 and pivot boat 24 about an axis extending vertically between saddles 28 to move first end portion 86 into position between front saddles 26. Boat 24 is now positioned above crossbars 18, 20 in saddles 26, 28. Person 84 then may retract support member 32 to a stored position within crossbar 18. It will be understood that load assist 16 may function as an extension from either or both crossbars and on either or both sides of the vehicle. Furthermore, it will be understood that the loading protocol presented is exemplary, and other loading protocols may be suitable for use with boat loading systems of the invention.

Although the invention has been disclosed in its preferred forms, the specific embodiments thereof as disclosed and illustrated herein are not to be considered in a limiting sense, because numerous variations are possible. Applicants regard the subject matter of their invention to include all novel and non-obvious combinations and subcombinations of the various elements, features, functions, and/or properties disclosed herein.

I claim:

1. A rack device for loading and carrying elongate cargo on a roof of a vehicle comprising
   first and second crossbars, each crossbar being attachable via a pair of tower devices ridigly across the roof of a vehicle such that the crossbars are oriented in parallel to each other perpendicular to the vehicle's direction of travel,
   a plurality of boat saddles connected to the crossbars for supporting a boat on top of the vehicle in transit,
   a single support member that telescopes independently out of the first crossbar to a fully extended horizontal position with substantially the entire length of the support member at approximately the height of the first cross bar, the support member being configured to provide support for loading a boat from a side of the vehicle to a secure carrying position on top of the crossbars,
   a stop mechanism preventing the support member from sliding completely out of the first crossbar, and
   a load retainer positioned near a distal end portion of the support member to prevent cargo from sliding off the support member while loading.

2. The rack device of claim 1, wherein the stop mechanism includes a collar that mounts on the end of the first crossbar, and a contact member near a proximal end of the support member, the contact member preventing the support member from being completely removed from the collar.

3. The rack device of claim 1, wherein the support member has a long axis, the load retainer being substantially symmetrical relative to the long axis of the support member.

4. The rack device of claim 1, wherein the support member has a long axis, and a portion of the load retainer extends in a direction at least substantially perpendicular to the long axis of the support member.

5. The rack device of claim 1, wherein the load retainer is configured to function as a handle member so the support member can be easily deployed between stored and deployed positions.

6. The rack device of claim 1, further comprising
   a collar configured to be mounted on the end of the first crossbar, and
   a contact member disposed near a proximal end of the support member, the contact member preventing the support member from being completely removed from the collar.

7. The device of of claim 1, wherein the support member is a bar, the bar being comprised of a steel core and an outer aluminum sheath.

8. A rack device for loading and carrying elongate cargo on a roof of a vehicle comprising
   first and second crossbars, each crossbar being attachable via a pair of tower devices ridigly across the roof of a vehicle such that the crossbars are oriented in parallel to each other perpendicular to the vehicle's direction of travel,
   a plurality of boat saddles connected to the crossbars for supporting a boat on top of the vehicle in transit,
   a single elongate support member having a distal end portion, the support member being configured to telescope independently out of an end of the first crossbar, from a stored to a fully extended horizontal working position with substantially the entire length of the support member at approximately the height of the first cross bar, the support member being configured to provide support for loading a boat from a side of the vehicle to a secure carrying position on the boat saddles on top of the car, and a handle member connected to the distal end portion of the support member adjacent the distal end portion.

9. The rack device of claim 8, wherein the support member is at least substantially rectangular in cross section.

10. The rack device of claim 8, wherein the support member is a bar, the bar having a load-bearing core and a rust-resistant exterior.

11. The rack device of claim 10, wherein the core includes steel and the rust-resistant exterior includes aluminum.

12. The rack device of claim 1, wherein the support member has a central axis, the load retainer being symmetrical around the central axis of the support member.

* * * * *